United States Patent
Keating et al.

(10) Patent No.: US 12,149,705 B2
(45) Date of Patent: Nov. 19, 2024

(54) CONTROLLING VIDEO DATA ENCODING AND DECODING LEVELS

(71) Applicant: SONY GROUP CORPORATION, Tokyo (JP)

(72) Inventors: Stephen Mark Keating, Basingstoke (GB); Karl James Sharman, Basingstoke (GB); Adrian Richard Browne, Basingstoke (GB)

(73) Assignee: SONY GROUP CORPORATION, Tokyo (JP)

(*) Notice: Subject to any disclaimer, the term of this patent is extended or adjusted under 35 U.S.C. 154(b) by 0 days.

(21) Appl. No.: 17/937,274

(22) Filed: Sep. 30, 2022

(65) Prior Publication Data

US 2023/0087135 A1 Mar. 23, 2023

Related U.S. Application Data

(63) Continuation of application No. PCT/GB2020/053234, filed on Dec. 16, 2020, which
(Continued)

(51) Int. Cl.
*H04N 19/157* (2014.01)
*H04N 19/172* (2014.01)
(Continued)

(52) U.S. Cl.
CPC ......... *H04N 19/157* (2014.11); *H04N 19/172* (2014.11); *H04N 19/186* (2014.11); *H04N 19/45* (2014.11)

(58) Field of Classification Search
CPC .. H04N 19/157; H04N 19/172; H04N 19/186; H04N 19/45
(Continued)

(56) References Cited

U.S. PATENT DOCUMENTS 9,351,007 B1 * 5/2016 Hobbs ................. H04N 19/102
10,560,715 B2 * 2/2020 Laroche ............... H04N 19/147
(Continued)

FOREIGN PATENT DOCUMENTS

CN 104620575 A 5/2015
CN 109255750 A 1/2019
(Continued)

OTHER PUBLICATIONS

Bross et al. "JVET: Versatile Video Coding (Draft 8)" Jan. 2020 (Year: 2020).*
(Continued)

*Primary Examiner* — Matthew David Kim
(74) *Attorney, Agent, or Firm* — Oblon, McClelland, Maier & Neustadt, L.L.P.

(57) ABSTRACT

An apparatus including a video data decoder configured to decode an input video data stream, the video data decoder being responsive to a parameter value associated with the input video data stream, the parameter value indicating an encoding level selected from a plurality of encoding levels, each encoding level defining at least a maximum luminance picture size and a maximum luminance sample rate, the encoding level defining a first numerical component and a second numerical component, the second numerical component being a numerical value greater than or equal to zero, in which for encoding levels having a second numerical component of zero, the first numerical component increases monotonically with increasing maximum luminance picture size, and the second component varies with the maximum luminance sample rate; the parameter value being a numeric encoding of the encoding level.

19 Claims, 8 Drawing Sheets

| | JVET-Q2001-vB Table A.1 | | | JVET-Q2001-vB Table A.2 | |
|---|---|---|---|---|---|
| Level | Max luma picture size MaxLumaPs (samples) | Example max luma size | | Max luma sample rate MaxLumaSr (samples/sec) | Max frame rate of max size MaxLumaSr/ MaxLumaPs (frames/sec) |
| 1 | 36,864 | | | 552,960 | |
| 2 | 122,880 | | | 3,686,400 | |
| 2.1 | 245,760 | | | 7,372,800 | |
| 3 | 552,960 | | | 16,588,800 | |
| 3.1 | 983,040 | | | 33,177,600 | |
| 4 | 2,228,224 | 2048x1088 | | 66,846,720 | 30 |
| 4.1 | 2,228,224 | 2048x1088 | | 133,693,440 | 60 |
| 5 | 8,912,896 | 4096x2176 | | 267,386,880 | 30 |
| 5.1 | 8,912,896 | 4096x2176 | | 534,773,760 | 60 |
| 5.2 | 8,912,896 | 4096x2176 | | 1,069,547,520 | 120 |
| 6 | 35,651,584 | 8192x4352 | | 1,069,547,520 | 30 |
| 6.1 | 35,651,584 | 8192x4352 | | 2,139,095,040 | 60 |
| 6.2 | 35,651,584 | 8192x4352 | | 4,278,190,080 | 120 |

Related U.S. Application Data is a continuation of application No. 16/839,271, filed on Apr. 3, 2020, now Pat. No. 11,140,399.

(51) Int. Cl.
*H04N 19/186* (2014.01)
*H04N 19/44* (2014.01)

(58) Field of Classification Search
USPC .................................................. 375/240.12
See application file for complete search history.

(56) References Cited

U.S. PATENT DOCUMENTS

| | | | | |
|---|---|---|---|---|
| 2014/0092961 | A1* | 4/2014 | Kerofsky | H04N 19/119 375/E7.243 |
| 2015/0245046 | A1 | 8/2015 | Tsukuba et al. | |
| 2016/0249056 | A1* | 8/2016 | Tsukuba | H04N 19/174 |
| 2016/0366422 | A1* | 12/2016 | Yin | H04N 19/70 |
| 2017/0070743 | A1* | 3/2017 | Zhou | H04N 19/186 |
| 2018/0308458 | A1* | 10/2018 | Hall | H04N 19/98 |
| 2019/0019323 | A1* | 1/2019 | Fielding | G09G 5/02 |
| 2019/0208173 | A1* | 7/2019 | Kadu | G06T 5/40 |
| 2023/0421784 | A1* | 12/2023 | Tsukuba | H04N 19/44 |

FOREIGN PATENT DOCUMENTS

| | | |
|---|---|---|
| CN | 109416832 A | 3/2019 |
| JP | 2012065177 A | 3/2012 |
| JP | 2015533054 A | 11/2015 |
| JP | 2018117354 A | 7/2018 |

OTHER PUBLICATIONS

Vivienne Sze et al., High Efficiency Video Coding (HEVC), Algorithms and Architectures, Integrated Circuits and Systems, Aug. 24, 2014, 383 pages, USA.

Benjamin Bross, "Versatile Video Coding (Draft 8)", Joint Video Experts Team (JVET) of ITU-T SG 16 WP 3 and ISO/IEC JTC 1/SC 29/WG 11, 17th Meeting: Brussels, Belgium, Jan. 7-17, 2020, Document: JVET-Q2001-vE, Version 15, Mar. 12, 2020, 515 pages.

ITU-T. "Series H: Audiovisual and Multimedia Systems, Infrastructure of audiovisual services—Coding of moving video, Advanced video coding for generic audiovisual services", H.264, Telecommunication Standardization Sector of ITU, Jun. 2019, 836 pages, Geneva, Switzerland.

ITU-T, "Series H: Audiovisual and Multimedia Systems, Infrastructure of audiovisual services—Coding of moving video, High efficiency video coding", H.265, Telecommunication Standardization Sector of ITU, Nov. 2019, 712 pages, Geneva, Switzerland.

International Search Report and Written Opinion mailed Feb. 8, 2021 in corresponding PCT Application No. PCT/GB2020/053234 (8 pages).

Keating et al., "AHG9: Level coding in VVC", Joint Video Experts Team of ITU-T SG 16 WP 3 and ISO/IEC .ITC I/SC 29/WG 11, JVET-R0245, Apr. 15, 2020.

* cited by examiner

| | JVET-Q2001-vB Table A.1 | | | JVET-Q2001-vB Table A.2 | |
|---|---|---|---|---|---|
| Level | Max luma picture size MaxLumaPs (samples) | Example max luma size | | Max luma sample rate MaxLumaSr (samples/sec) | Max frame rate of max size MaxLumaSr/ MaxLumaPs (frames/sec) |
| 1 | 36,864 | | | 552,960 | |
| 2 | 122,880 | | | 3,686,400 | |
| 2.1 | 245,760 | | | 7,372,800 | |
| 3 | 552,960 | | | 16,588,800 | |
| 3.1 | 983,040 | | | 33,177,600 | |
| 4 | 2,228,224 | 2048x1088 | | 66,846,720 | 30 |
| 4.1 | 2,228,224 | 2048x1088 | | 133,693,440 | 60 |
| 5 | 8,912,896 | 4096x2176 | | 267,386,880 | 30 |
| 5.1 | 8,912,896 | 4096x2176 | | 534,773,760 | 60 |
| 5.2 | 8,912,896 | 4096x2176 | | 1,069,547,520 | 120 |
| 6 | 35,651,584 | 8192x4352 | | 1,069,547,520 | 30 |
| 6.1 | 35,651,584 | 8192x4352 | | 2,139,095,040 | 60 |
| 6.2 | 35,651,584 | 8192x4352 | | 4,278,190,080 | 120 |

FIG. 9

| Level | JVET-Q2001-vB Table A.1 | | | JVET-Q2001-vB Table A.2 | |
|---|---|---|---|---|---|
| | Max luma picture size MaxLumaPs (samples) | Example max luma size | | Max luma sample rate MaxLumaSr (samples/sec) | Max frame rate of max size MaxLumaSr/MaxLumaPs (frames/sec) |
| 1 | 36,864 | | | 552,960 | |
| 2 | 122,880 | | | 3,686,400 | |
| 2.1 | 245,760 | | | 7,372,800 | |
| 3 | 552,960 | | | 16,588,800 | |
| 3.1 | 983,040 | | | 33,177,600 | |
| 4 | 2,228,224 | 2048x1088 | | 66,846,720 | 30 |
| 4.1 | 2,228,224 | 2048x1088 | | 133,693,440 | 60 |
| 5 | 8,912,896 | 4096x2176 | | 267,386,880 | 30 |
| 5.1 | 8,912,896 | 4096x2176 | | 534,773,760 | 60 |
| 5.2 | 8,912,896 | 4096x2176 | | 1,069,547,520 | 120 |
| 5.3 | 8,912,896 | 4096x2176 | | 2,139,095,040 | 240 |
| 6 | 35,651,584 | 8192x4352 | | 1,069,547,520 | 30 |
| 6.1 | 35,651,584 | 8192x4352 | | 2,139,095,040 | 60 |
| 6.2 | 35,651,584 | 8192x4352 | | 4,278,190,080 | 120 |

FIG. 10

CONTROLLING VIDEO DATA ENCODING AND DECODING LEVELS

CROSS-REFERENCE TO RELATED APPLICATIONS

This application is a continuation of and claims priority to PCT Application No. PCT/GB2020/053234, filed on Dec. 16, 2020, which claims priority to U.S. patent application Ser. No. 16/839,271, filed on Apr. 3, 2020, now U.S. Pat. No. 11,140,399. The benefit of priority is claimed to each of the foregoing, and the entire contents of each of the foregoing are incorporated herein by reference.

BACKGROUND

Field

This disclosure relates to video data encoding and decoding.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, is neither expressly or impliedly admitted as prior art against the present disclosure.

There are several systems, such as video or image data encoding and decoding systems which involve transforming video data into a frequency domain representation, quantising the frequency domain coefficients and then applying some form of entropy encoding to the quantised coefficients. This can achieve compression of the video data. A corresponding decoding or decompression technique is applied to recover a reconstructed version of the original video data.

SUMMARY

The present disclosure addresses or mitigates problems arising from this processing.

Respective aspects and features of the present disclosure are defined in the appended claims.

It is to be understood that both the foregoing general description and the following detailed description are exemplary, but are not restrictive, of the present technology.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 9 and 10 schematically illustrate sets of encoding levels;

DESCRIPTION OF THE PREFERRED EMBODIMENTS

Figure 1:
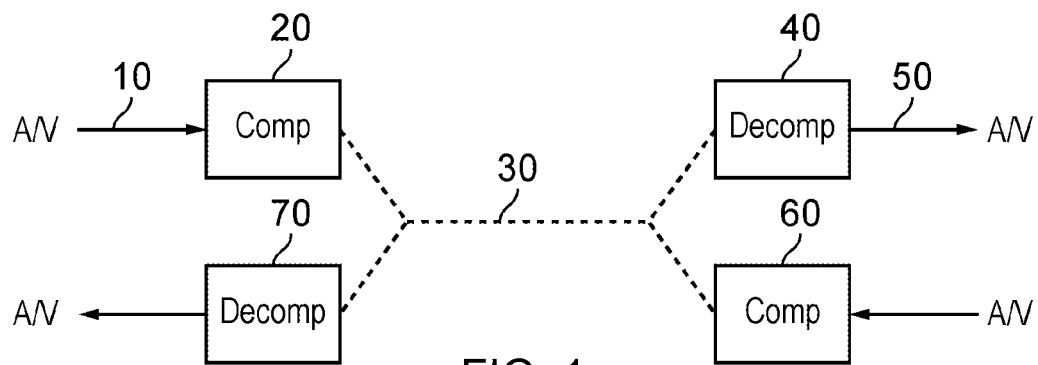
FIG. 1 schematically illustrates an audio/video (A/V) data transmission and reception system using video data compression and decompression.

Referring now to the drawings, FIGS. 1-4 are provided to give schematic illustrations of apparatus or systems making use of the compression and/or decompression apparatus to be described below in connection with embodiments of the present technology.

All of the data compression and/or decompression apparatus to be described below may be implemented in hardware, in software running on a general-purpose data processing apparatus such as a general-purpose computer, as programmable hardware such as an application specific integrated circuit (ASIC) or field programmable gate array (FPGA) or as combinations of these. In cases where the embodiments are implemented by software and/or firmware, it will be appreciated that such software and/or firmware, and non-transitory data storage media by which such software and/or firmware are stored or otherwise provided, are considered as embodiments of the present technology.

FIG. 1 schematically illustrates an audio/video data transmission and reception system using video data compression and decompression. In this example, the data values to be encoded or decoded represent image data.

An input audio/video signal 10 is supplied to a video data compression apparatus 20 which compresses at least the video component of the audio/video signal 10 for transmission along a transmission route 30 such as a cable, an optical fibre, a wireless link or the like. The compressed signal is processed by a decompression apparatus 40 to provide an output audio/video signal 50. For the return path, a compression apparatus 60 compresses an audio/video signal for transmission along the transmission route 30 to a decompression apparatus 70.

The compression apparatus 20 and decompression apparatus 70 can therefore form one node of a transmission link. The decompression apparatus 40 and decompression apparatus 60 can form another node of the transmission link. Of course, in instances where the transmission link is unidirectional, only one of the nodes would require a compression apparatus and the other node would only require a decompression apparatus.

Figure 2:
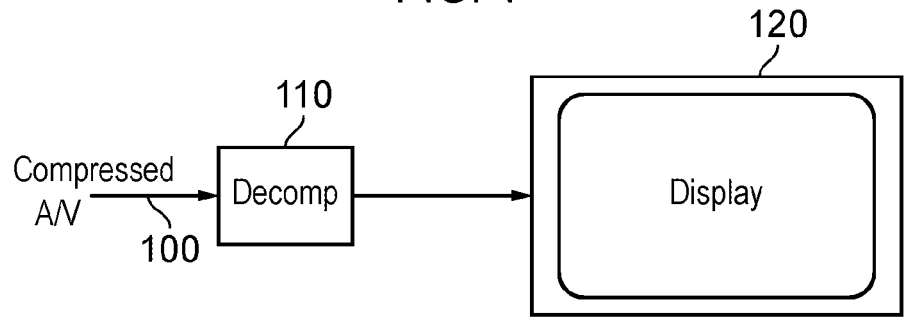
FIG. 2 schematically illustrates a video display system using video data decompression.

FIG. 2 schematically illustrates a video display system using video data decompression. In particular, a compressed audio/video signal 100 is processed by a decompression apparatus 110 to provide a decompressed signal which can be displayed on a display 120. The decompression apparatus 110 could be implemented as an integral part of the display 120, for example being provided within the same casing as the display device. Alternatively, the decompression apparatus 110 maybe provided as (for example) a so-called set top box (STB), noting that the expression "set-top" does not imply a requirement for the box to be sited in any particular orientation or position with respect to the display 120; it is simply a term used in the art to indicate a device which is connectable to a display as a peripheral device.

Figure 3:
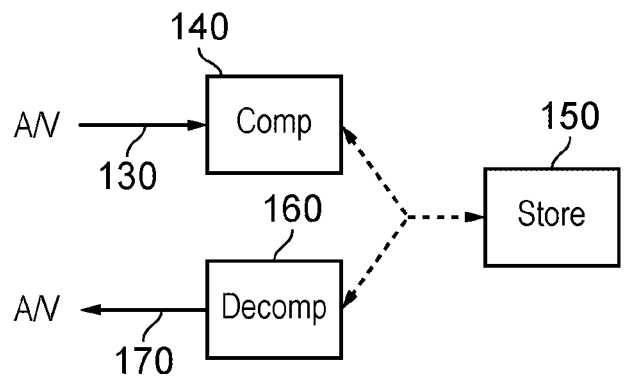
FIG. 3 schematically illustrates an audio/video storage system using video data compression and decompression.

FIG. 3 schematically illustrates an audio/video storage system using video data compression and decompression. An input audio/video signal 130 is supplied to a compression apparatus 140 which generates a compressed signal for storing by a store device 150 such as a magnetic disk device, an optical disk device, a magnetic tape device, a solid state storage device such as a semiconductor memory or other storage device. For replay, compressed data is read from the storage device 150 and passed to a decompression apparatus 160 for decompression to provide an output audio/video signal 170.

It will be appreciated that the compressed or encoded signal, and a storage medium such as a machine-readable non-transitory storage medium, storing that signal, are considered as embodiments of the present technology.

Figure 4:
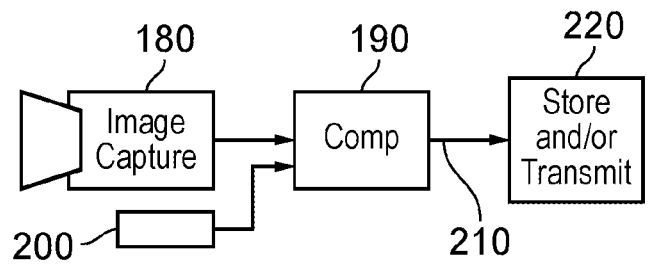
FIG. 4 schematically illustrates a video camera using video data compression.

FIG. 4 schematically illustrates a video camera using video data compression. In FIG. 4, an image capture device 180, such as a charge coupled device (CCD) image sensor and associated control and read-out electronics, generates a video signal which is passed to a compression apparatus 190. A microphone (or plural microphones) 200 generates an audio signal to be passed to the compression apparatus 190. The compression apparatus 190 generates a compressed audio/video signal 210 to be stored and/or transmitted (shown generically as a schematic stage 220).

The techniques to be described below relate primarily to video data compression and decompression. It will be appreciated that many existing techniques may be used for audio data compression in conjunction with the video data compression techniques which will be described, to generate a compressed audio/video signal. Accordingly, a separate discussion of audio data compression will not be provided. It will also be appreciated that the data rate associated with video data, in particular broadcast quality video data, is generally very much higher than the data rate associated with audio data (whether compressed or uncompressed). It will therefore be appreciated that uncompressed audio data could accompany compressed video data to form a compressed audio/video signal. It will further be appreciated that although the present examples (shown in FIGS. 1-4) relate to audio/video data, the techniques to be described below can find use in a system which simply deals with (that is to say, compresses, decompresses, stores, displays and/or transmits) video data. That is to say, the embodiments can apply to video data compression without necessarily having any associated audio data handling at all.

FIG. 4 therefore provides an example of a video capture apparatus comprising an image sensor and an encoding apparatus of the type to be discussed below. FIG. 2 therefore provides an example of a decoding apparatus of the type to be discussed below and a display to which the decoded images are output.

A combination of FIGS. 2 and 4 may provide a video capture apparatus comprising an image sensor 180 and encoding apparatus 190, decoding apparatus 110 and a display 120 to which the decoded images are output.

Figure 5:
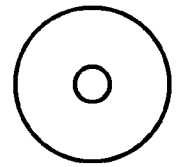
FIGS. 5 and 6 schematically illustrate storage media.
Figure 6:
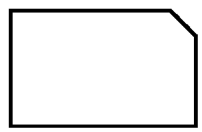

FIGS. 5 and 6 schematically illustrate storage media, which store (for example) the compressed data generated by the apparatus 20, 60, the compressed data input to the apparatus 110 or the storage media or stages 150, 220. FIG. 5 schematically illustrates a disc storage medium such as a magnetic or optical disc, and FIG. 6 schematically illustrates a solid state storage medium such as a flash memory. Note that FIGS. 5 and 6 can also provide examples of non-transitory machine-readable storage media which store computer software which, when executed by a computer, causes the computer to carry out one or more of the methods to be discussed below.

Therefore, the above arrangements provide examples of video storage, capture, transmission or reception apparatuses embodying any of the present techniques.

Figure 7:
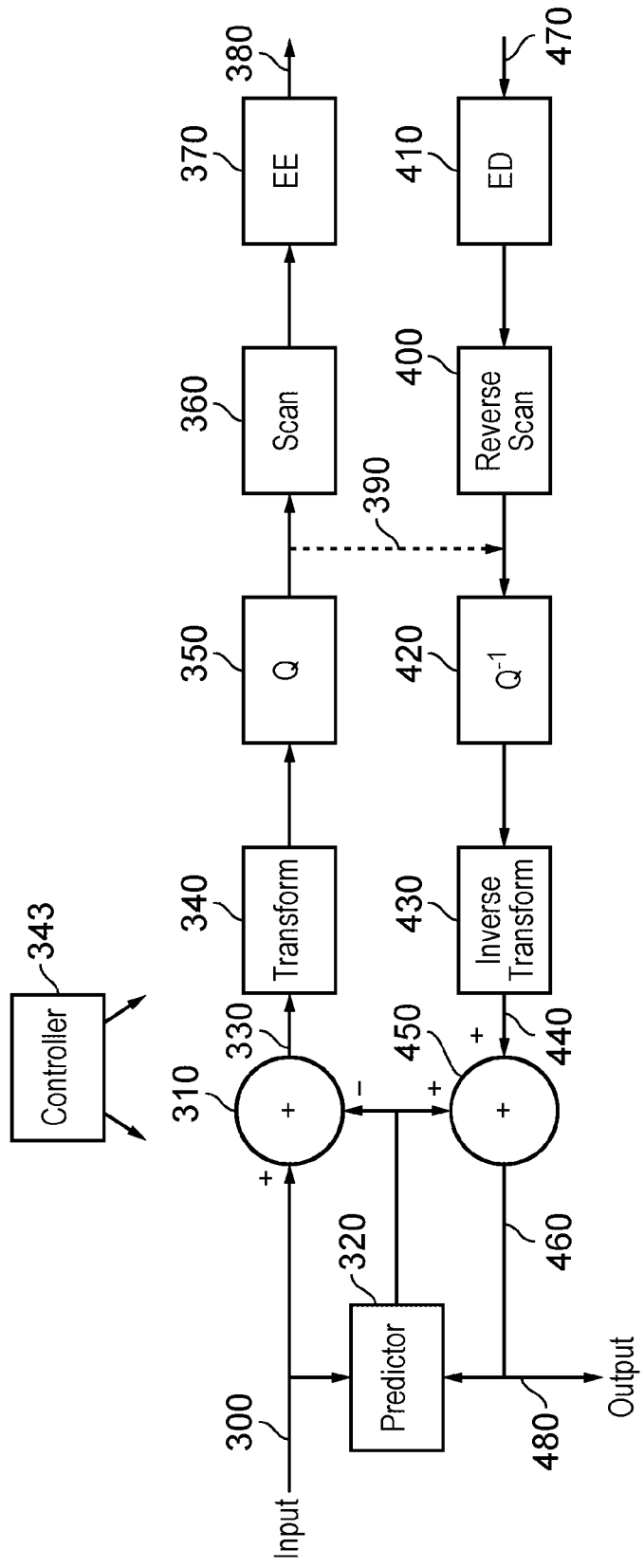
FIG. 7 provides a schematic overview of a video data compression and decompression apparatus.

FIG. 7 provides a schematic overview of a video or image data compression (encoding) and decompression (decoding) apparatus, for encoding and/or decoding video or image data representing one or more images.

A controller 343 controls the overall operation of the apparatus and, in particular when referring to a compression mode, controls a trial encoding processes by acting as a selector to select various modes of operation such as block sizes and shapes, and whether the video data is to be encoded losslessly or otherwise. The controller is considered to form part of the image encoder or image decoder (as the case may be). Successive images of an input video signal 300 are supplied to an adder 310 and to an image predictor 320. The image predictor 320 will be described below in more detail with reference to FIG. 8. The image encoder or decoder (as the case may be) plus the intra-image predictor of FIG. 8 may use features from the apparatus of FIG. 7. This does not mean that the image encoder or decoder necessarily requires every feature of FIG. 7 however.

The adder 310 in fact performs a subtraction (negative addition) operation, in that it receives the input video signal 300 on a "+" input and the output of the image predictor 320 on a "−" input, so that the predicted image is subtracted from the input image. The result is to generate a so-called residual image signal 330 representing the difference between the actual and predicted images.

One reason why a residual image signal is generated is as follows. The data coding techniques to be described, that is to say the techniques which will be applied to the residual image signal, tend to work more efficiently when there is less "energy" in the image to be encoded. Here, the term "efficiently" refers to the generation of a small amount of encoded data; for a particular image quality level, it is desirable (and considered "efficient") to generate as little data as is practicably possible. The reference to "energy" in the residual image relates to the amount of information contained in the residual image. If the predicted image were to be identical to the real image, the difference between the two (that is to say, the residual image) would contain zero information (zero energy) and would be very easy to encode into a small amount of encoded data. In general, if the prediction process can be made to work reasonably well such that the predicted image content is similar to the image content to be encoded, the expectation is that the residual image data will contain less information (less energy) than the input image and so will be easier to encode into a small amount of encoded data.

Therefore, encoding (using the adder 310) involves predicting an image region for an image to be encoded; and generating a residual image region dependent upon the difference between the predicted image region and a corresponding region of the image to be encoded. In connection with the techniques to be discussed below, the ordered array of data values comprises data values of a representation of the residual image region. Decoding involves predicting an image region for an image to be decoded; generating a residual image region indicative of differences between the predicted image region and a corresponding region of the image to be decoded; in which the ordered array of data values comprises data values of a representation of the residual image region; and combining the predicted image region and the residual image region.

The remainder of the apparatus acting as an encoder (to encode the residual or difference image) will now be described.

The residual image data 330 is supplied to a transform unit or circuitry 340 which generates a discrete cosine transform (DCT) representation of blocks or regions of the residual image data. The DCT technique itself is well known and will not be described in detail here. Note also that the use of DCT is only illustrative of one example arrangement. Other transforms which might be used include, for example, the discrete sine transform (DST). A transform could also comprise a sequence or cascade of individual transforms, such as an arrangement in which one transform is followed (whether directly or not) by another transform. The choice of transform may be determined explicitly and/or be dependent upon side information used to configure the encoder and decoder. In other examples a so-called "transform skip" mode can selectively be used in which no transform is applied.

Therefore, in examples, an encoding and/or decoding method comprises predicting an image region for an image to be encoded; and generating a residual image region dependent upon the difference between the predicted image region and a corresponding region of the image to be encoded; in which the ordered array of data values (to be discussed below) comprises data values of a representation of the residual image region.

The output of the transform unit 340, which is to say (in an example), a set of DCT coefficients for each transformed block of image data, is supplied to a quantiser 350. Various quantisation techniques are known in the field of video data compression, ranging from a simple multiplication by a quantisation scaling factor through to the application of complicated lookup tables under the control of a quantisation parameter. The general aim is twofold. Firstly, the quantisation process reduces the number of possible values of the transformed data. Secondly, the quantisation process can increase the likelihood that values of the transformed data are zero. Both of these can make the entropy encoding process, to be described below, work more efficiently in generating small amounts of compressed video data.

A data scanning process is applied by a scan unit 360. The purpose of the scanning process is to reorder the quantised transformed data so as to gather as many as possible of the non-zero quantised transformed coefficients together, and of course therefore to gather as many as possible of the zero-valued coefficients together. These features can allow so-called run-length coding or similar techniques to be applied efficiently. So, the scanning process involves selecting coefficients from the quantised transformed data, and in particular from a block of coefficients corresponding to a block of image data which has been transformed and quantised, according to a "scanning order" so that (a) all of the coefficients are selected once as part of the scan, and (b) the scan tends to provide the desired reordering. One example scanning order which can tend to give useful results is a so-called up-right diagonal scanning order.

The scanning order can be different, as between transform-skip blocks and transform blocks (blocks which have undergone at least one spatial frequency transformation).

The scanned coefficients are then passed to an entropy encoder (EE) 370. Again, various types of entropy encoding may be used. Two examples are variants of the so-called CABAC (Context Adaptive Binary Arithmetic Coding) system and variants of the so-called CAVLC (Context Adaptive Variable-Length Coding) system. In general terms, CABAC is considered to provide a better efficiency, and in some studies has been shown to provide a 10-20% reduction in the quantity of encoded output data for a comparable image quality compared to CAVLC. However, CAVLC is considered to represent a much lower level of complexity (in terms of its implementation) than CABAC. Note that the scanning process and the entropy encoding process are shown as separate processes, but in fact can be combined or treated together. That is to say, the reading of data into the entropy encoder can take place in the scan order. Corresponding considerations apply to the respective inverse processes to be described below.

The output of the entropy encoder 370, along with additional data (mentioned above and/or discussed below), for example defining the manner in which the predictor 320 generated the predicted image, whether the compressed data was transformed or transform-skipped or the like, provides a compressed output video signal 380.

However, a return path 390 is also provided because the operation of the predictor 320 itself depends upon a decompressed version of the compressed output data.

The reason for this feature is as follows. At the appropriate stage in the decompression process (to be described below) a decompressed version of the residual data is generated. This decompressed residual data has to be added to a predicted image to generate an output image (because the original residual data was the difference between the input image and a predicted image). In order that this process is comparable, as between the compression side and the decompression side, the predicted images generated by the predictor 320 should be the same during the compression process and during the decompression process. Of course, at decompression, the apparatus does not have access to the original input images, but only to the decompressed images. Therefore, at compression, the predictor 320 bases its prediction (at least, for inter-image encoding) on decompressed versions of the compressed images.

The entropy encoding process carried out by the entropy encoder 370 is considered (in at least some examples) to be "lossless", which is to say that it can be reversed to arrive at exactly the same data which was first supplied to the entropy encoder 370. So, in such examples the return path can be implemented before the entropy encoding stage. Indeed, the scanning process carried out by the scan unit 360 is also considered lossless, so in the present embodiment the return path 390 is from the output of the quantiser 350 to the input of a complimentary inverse quantiser 420. In instances where loss or potential loss is introduced by a stage, that stage (and its inverse) may be included in the feedback loop formed by the return path. For example, the entropy encoding stage can at least in principle be made lossy, for example by techniques in which bits are encoded within parity information. In such an instance, the entropy encoding and decoding should form part of the feedback loop.

In general terms, an entropy decoder 410, the reverse scan unit 400, an inverse quantiser 420 and an inverse transform unit or circuitry 430 provide the respective inverse functions of the entropy encoder 370, the scan unit 360, the quantiser 350 and the transform unit 340. For now, the discussion will continue through the compression process; the process to decompress an input compressed video signal will be discussed separately below.

In the compression process, the scanned coefficients are passed by the return path 390 from the quantiser 350 to the inverse quantiser 420 which carries out the inverse operation of the scan unit 360. An inverse quantisation and inverse transformation process are carried out by the units 420, 430 to generate a compressed-decompressed residual image signal 440.

The image signal 440 is added, at an adder 450, to the output of the predictor 320 to generate a reconstructed output image 460 (although this may be subject to so-called loop filtering and/or other filtering before being output—see below). This forms one input to the image predictor 320, as will be described below.

Turning now to the decoding process applied to decompress a received compressed video signal 470, the signal is supplied to the entropy decoder 410 and from there to the chain of the reverse scan unit 400, the inverse quantiser 420 and the inverse transform unit 430 before being added to the output of the image predictor 320 by the adder 450. So, at the decoder side, the decoder reconstructs a version of the residual image and then applies this (by the adder 450) to the predicted version of the image (on a block by block basis) so as to decode each block. In straightforward terms, the output 460 of the adder 450 forms the output decompressed video signal 480 (subject to the filtering processes discussed below). In practice, further filtering may optionally be applied (for example, by a loop filter 565 shown in FIG. 8 but omitted from FIG. 7 for clarity of the higher level diagram of FIG. 7) before the signal is output.

Figure 8:
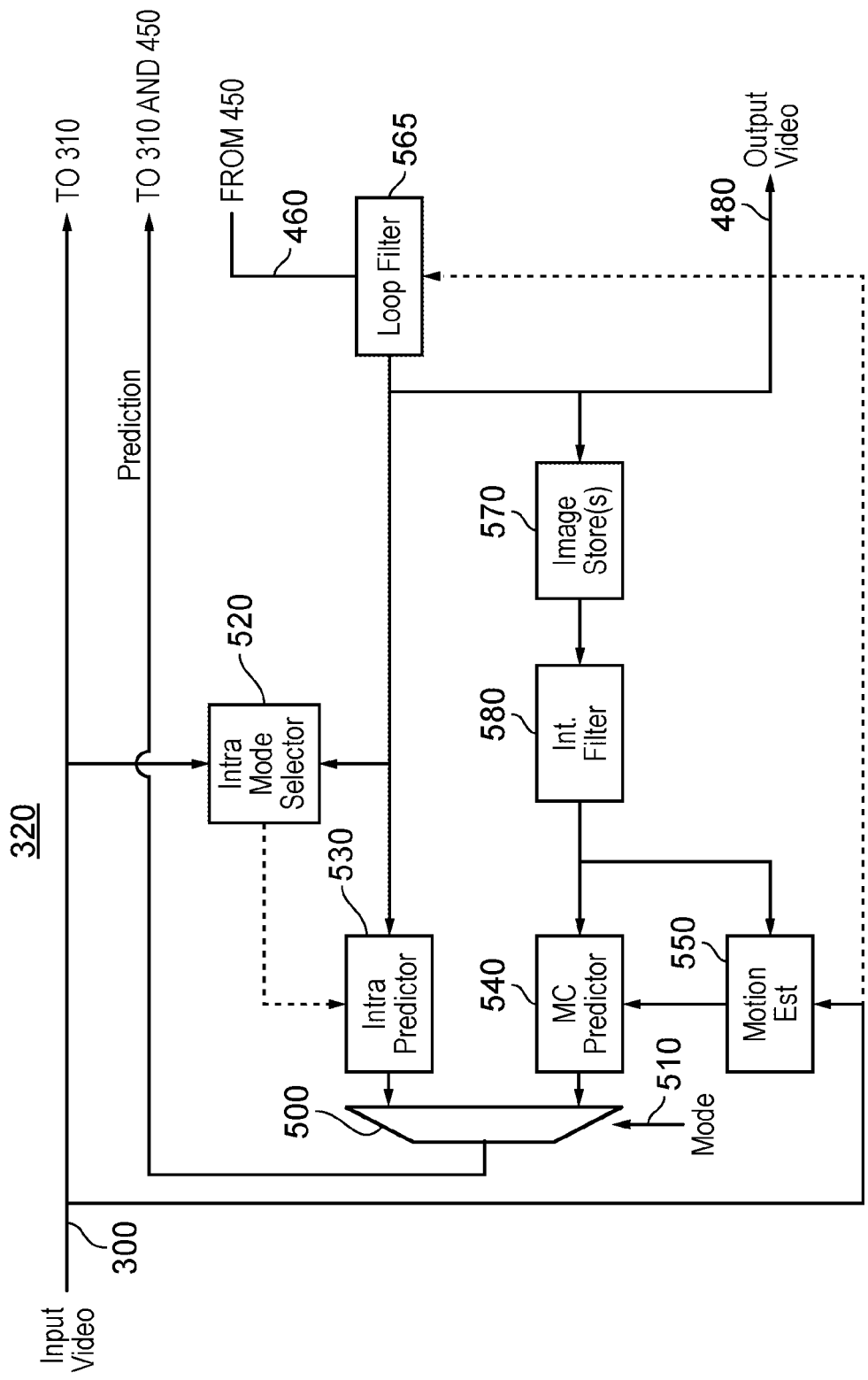
FIG. 8 schematically illustrates a predictor.

The apparatus of FIGS. 7 and 8 can act as a compression (encoding) apparatus or a decompression (decoding) apparatus. The functions of the two types of apparatus substantially overlap. The scan unit 360 and entropy encoder 370 are not used in a decompression mode, and the operation of the predictor 320 (which will be described in detail below) and other units follow mode and parameter information contained in the received compressed bit-stream rather than generating such information themselves.

FIG. 8 schematically illustrates the generation of predicted images, and in particular the operation of the image predictor 320.

There are two basic modes of prediction carried out by the image predictor 320: so-called intra-image prediction and so-called inter-image, or motion-compensated (MC), prediction. At the encoder side, each involves detecting a prediction direction in respect of a current block to be predicted, and generating a predicted block of samples according to other samples (in the same (intra) or another (inter) image). By virtue of the units 310 or 450, the difference between the predicted block and the actual block is encoded or applied so as to encode or decode the block respectively.

(At the decoder, or at the reverse decoding side of the encoder, the detection of a prediction direction may be in response to data associated with the encoded data by the encoder, indicating which direction was used at the encoder. Or the detection may be in response to the same factors as those on which the decision was made at the encoder).

Intra-image prediction bases a prediction of the content of a block or region of the image on data from within the same image. This corresponds to so-called I-frame encoding in other video compression techniques. In contrast to I-frame encoding, however, which involves encoding the whole image by intra-encoding, in the present embodiments the choice between intra- and inter-encoding can be made on a block-by-block basis, though in other embodiments the choice is still made on an image-by-image basis.

Motion-compensated prediction is an example of inter-image prediction and makes use of motion information which attempts to define the source, in another adjacent or nearby image, of image detail to be encoded in the current image. Accordingly, in an ideal example, the contents of a block of image data in the predicted image can be encoded very simply as a reference (a motion vector) pointing to a corresponding block at the same or a slightly different position in an adjacent image.

A technique known as "block copy" prediction is in some respects a hybrid of the two, as it uses a vector to indicate a block of samples at a position displaced from the currently predicted block within the same image, which should be copied to form the currently predicted block.

Returning to FIG. 8, two image prediction arrangements (corresponding to intra- and inter-image prediction) are shown, the results of which are selected by a multiplexer 500 under the control of a mode signal 510 (for example, from the controller 343) so as to provide blocks of the predicted image for supply to the adders 310 and 450. The choice is made in dependence upon which selection gives the lowest "energy" (which, as discussed above, may be considered as information content requiring encoding), and the choice is signalled to the decoder within the encoded output datastream. Image energy, in this context, can be detected, for example, by carrying out a trial subtraction of an area of the two versions of the predicted image from the input image, squaring each pixel value of the difference image, summing the squared values, and identifying which of the two versions gives rise to the lower mean squared value of the difference image relating to that image area. In other examples, a trial encoding can be carried out for each selection or potential selection, with a choice then being made according to the cost of each potential selection in terms of one or both of the number of bits required for encoding and distortion to the picture.

The actual prediction, in the intra-encoding system, is made on the basis of image blocks received as part of the signal 460 (as filtered by loop filtering; see below), which is to say, the prediction is based upon encoded-decoded image blocks in order that exactly the same prediction can be made at a decompression apparatus. However, data can be derived from the input video signal 300 by an intra-mode selector 520 to control the operation of the intra-image predictor 530.

For inter-image prediction, a motion compensated (MC) predictor 540 uses motion information such as motion vectors derived by a motion estimator 550 from the input video signal 300. Those motion vectors are applied to a processed version of the reconstructed image 460 by the motion compensated predictor 540 to generate blocks of the inter-image prediction.

Accordingly, the units 530 and 540 (operating with the estimator 550) each act as detectors to detect a prediction direction in respect of a current block to be predicted, and as a generator to generate a predicted block of samples (forming part of the prediction passed to the units 310 and 450) according to other samples defined by the prediction direction.

The processing applied to the signal 460 will now be described.

Firstly, the signal may be filtered by a so-called loop filter 565. Various types of loop filters may be used. One technique involves applying a "deblocking" filter to remove or at least tend to reduce the effects of the block-based processing carried out by the transform unit 340 and subsequent operations. A further technique involving applying a so-called sample adaptive offset (SAO) filter may also be used. In general terms, in a sample adaptive offset filter, filter parameter data (derived at the encoder and communicated to the decoder) defines one or more offset amounts to be selectively combined with a given intermediate video sample (a sample of the signal 460) by the sample adaptive offset filter in dependence upon a value of: (i) the given intermediate video sample; or (ii) one or more intermediate video samples having a predetermined spatial relationship to the given intermediate video sample.

Also, an adaptive loop filter is optionally applied using coefficients derived by processing the reconstructed signal 460 and the input video signal 300. The adaptive loop filter is a type of filter which, using known techniques, applies adaptive filter coefficients to the data to be filtered. That is to say, the filter coefficients can vary in dependence upon various factors. Data defining which filter coefficients to use is included as part of the encoded output data-stream.

Techniques to be discussed below relate to the handling of parameter data relating to the operation of filters. The actual filtering operations (such as SAO filtering) may use otherwise known techniques.

The filtered output from the loop filter unit 565 in fact forms the output video signal 480 when the apparatus is operating as a decompression apparatus. It is also buffered in one or more image or frame stores 570; the storage of successive images is a requirement of motion compensated prediction processing, and in particular the generation of motion vectors. To save on storage requirements, the stored images in the image stores 570 may be held in a compressed form and then decompressed for use in generating motion vectors. For this particular purpose, any known compression/decompression system may be used. The stored images may be passed to an interpolation filter 580 which generates a higher resolution version of the stored images; in this example, intermediate samples (sub-samples) are generated such that the resolution of the interpolated image is output by the interpolation filter 580 is 4 times (in each dimension) that of the images stored in the image stores 570 for the luminance channel of 4:2:0 and 8 times (in each dimension) that of the images stored in the image stores 570 for the chrominance channels of 4:2:0. The interpolated images are passed as an input to the motion estimator 550 and also to the motion compensated predictor 540.

The way in which an image is partitioned for compression processing will now be described. At a basic level, an image to be compressed is considered as an array of blocks or regions of samples. The splitting of an image into such blocks or regions can be carried out by a decision tree, such as that described in SERIES H: AUDIOVISUAL AND MULTIMEDIA SYSTEMS Infrastructure of audiovisual services—Coding of moving video High efficiency video coding Recommendation ITU-T H.265 12/2016. Also: High Efficiency Video Coding (HEVC) Algorithms and Architectures, chapter 3, Editors: Madhukar Budagavi, Gary J. Sullivan, Vivienne Sze; ISBN 978-3-319-06894-7; 2014 which are incorporated herein in their respective entireties by reference. Further background information is provided in [1] "Versatile Video Coding (Draft 8)", JVET-Q2001-vE, B. Bross, J. Chen, S. Liu and Y-K. Wang, which is also incorporated herein in its entirety by reference.

In some examples, the resulting blocks or regions have sizes and, in some cases, shapes which, by virtue of the decision tree, can generally follow the disposition of image features within the image. This in itself can allow for an improved encoding efficiency because samples representing or following similar image features would tend to be grouped together by such an arrangement. In some examples, square blocks or regions of different sizes (such as 4×4 samples up to, say, 64×64 or larger blocks) are available for selection. In other example arrangements, blocks or regions of different shapes such as rectangular blocks (for example, vertically or horizontally oriented) can be used. Other non-square and non-rectangular blocks are envisaged. The result of the division of the image into such blocks or regions is (in at least the present examples) that each sample of an image is allocated to one, and only one, such block or region.

Embodiments of the present disclosure, to be discussed below, concern techniques for representing encoding levels at the encoder and decoder.

Parameter Sets and Encoding Levels

When video data is encoded by the techniques discussed above for subsequent decoding, it is appropriate for the encoding side of the processing to communicate some parameters of the encoding process to the eventual decoding side of the processing. Given that these encoding parameters will be needed whenever the encoded video data is decoded, it is useful to associate the parameters with the encoded video data stream itself, for example (though not necessarily exclusively, as they could be sent "out of band" by a separate transmission channel) by embedding them in the encoded video data stream itself as so-called parameter sets.

Parameter sets may be represented as a hierarchy of information, for example as video parameter sets (VPS), sequence parameter sets (SPS) and picture parameter sets (PPS). The PPS would be expected to occur once each picture and to contain information relating to all encoded slices in that picture, the SPS less often (once per sequence of pictures) and the VPS less often still. Parameter sets which occur more often (such as the PPS) can be implemented as references to previously encoded instances of that parameter set to avoid the cost of re-encoding. Each encoded image slice references a single active PPS, SPS and VPS to provide information to be used in decoding that slice. In particular, each slice header may contain a PPS identifier to reference a PPS, which in turn references an SPS, which in turn references a VPS.

Amongst these parameter sets, the SPS contains example information relevant to some of the discussion below, namely data defining the so-called profile, tier and encoding level to be used.

The profile defines a set of decoding tools or functions to be used. Example profiles include the "Main Profile" relating to 4:2:0 video at 8 bits, and the "Main 10 Profile" allowing 10 bit resolution and other extensions with respect to the Main Profile.

The encoding level provides restrictions on matters such as maximum sample rate and picture size. The tier imposes a maximum data rate.

In the JVET (Joint Video Experts Team) proposals for versatile video coding (VVC), such as those defined (at the filing date) by the specification JVET-Q2001-vE referenced above, various levels are defined from 1 to 6.2.

The highest possible level is level 8.5, with this restriction being derived from the coding used, in that a level is coded in 8 bits as Level*30, which implies that level 8.5 is coded as the maximum 8 bit value of 255.

The current specification also defines the condition that decoders conforming to a given profile at a specific level of a specific tier shall be capable of decoding all bitstreams for which the following condition applies, which is to say that the bitstream is indicated to conform to a level (of the given profile at the given tier) that is not level 8.5 and is lower than or equal to the specified level.

The currently defined levels with example picture sizes and frame rates are shown schematically in FIG. 9, which represents an amalgamation of the respective conditions imposed by two example tables (A.1 and A.2) of the JVET document. Major components of the levels (indicative of the maximum luminance picture size and increasing monotonically with increasing maximum luminance picture size) are indicated by the whole number in the left column; minor components of levels (indicative of at least one of the maximum luminance sample rate and the maximum frame rate, in which for a given first component, the second component increases monotonically with increasing maximum luminance sample rate and increases monotonically with increasing maximum frame rate) are indicated by numbers after the decimal point.

Note that in principle one of the the maximum luminance sample rate and the maximum frame rate can be derived from the other and from the maximum luminance picture size, so although for clarity of the explanation both are specified in the tables, in principle only one of the two needs to be specified.

The data rates, picture sizes and so on are defined for luminance (or luma) components;

the corresponding data for chrominance (chroma) is then derivable from the chrominance subsampling format in use (such as 4:2:0 or 4:4:4, which define, for a given number of luminance samples, a corresponding number of chrominance samples.

Note that the column labelled "example max luma size" simply provides an example of a luma picture configuration which conforms with the number of samples defined by the respective max luma picture size and also with the aspect ratio constraints imposed by other parts of the current specification; this column is to assist in the present explanation and does not form part of the specification.

Potential Matters to be Addressed

There are several potential issues with the current specification of levels, which may be addressed at least in part by example embodiments to be discussed below.

Firstly, as defined, it is not worthwhile to create new levels between the different existing levels. For example, level 5.2 and level 6 have the same value of MaxLumaSr. The only possible change is to have some intermediate picture size, but this is not considered particularly useful.

Secondly, it is not possible to go beyond 120 fps (frames per second) for a given level picture size. The only option is to use a level with a larger picture size. This is because a change to a frame rate of more than 120 fps would take the max luma sample rate beyond that applicable to the next level. For example, a new level (say, 5.3) cannot be defined for 4K at 240 fps because this would require twice the sample rate of the current level 6, and it is a current requirement that a level 6 decoder would have to decode a level 5.X stream.

Thirdly, the maximum level is 8.5, which is undefined in the current specification but implies (by the existing exponential relationship of the levels from 4 upwards) a maximum image size of at least 32K (for example, 32768× 17408). Although this might not seem to be an immediate issue, it may cause problems, for example, for future omnidirectional applications that use subpictures.

To address these issues, a method and apparatus for coding (and decoding) the levels is proposed. In addition, an alternative constraint on the ability to decode streams is also proposed.

Level Coding in Example Embodiment

An alternative coding of levels is proposed as follows:
The level is coded in 8 bits as major*16+minor.
Here, "major" refers to the whole number value and "minor" to the value after the decimal point, so that for (say) level 5.2, major=5 and minor=2.

So, for example level 4.1 is coded as 65 and the maximum level is 15.15.

This arrangement implies that the set of levels does not "waste" codes of levels that cannot be ever defined for the reasons discussed above, or at least does not waste them to the extent of the current system.

Also, in turn extends the highest possible value from 8.5 to 15.15.

As an aside, the alternative coding also makes the level code easily visible in a hexadecimal dump representation because the first hexadecimal digit will represent the major component and the second hexadecimal digit the minor component.

Note that an alternative example will be given below. Either example (or indeed other examples) may be considered to lie within the scope of the appended claims.

Constraint of Decoding of Levels

To address the issue of higher frame rates not currently being possible without using a higher level (and therefore mandating the use of longer line buffers etc.), example embodiments change the constraint on the ability to decode streams.

The replacement constraint defines that decoders conforming to a given profile at a specific level, D.d, (where D indicates a major component and d a minor component) of a given tier shall be capable of decoding all bit streams (of the given profile at the given tier) for which the following condition applies, namely that the bitstream is indicated to conform to a level S.s (major.minor) that is not level 15.15 and S is lower than or equal to D and S*2+s is lower than or equal to D*2+d.

Using these arrangements new minor levels for higher frame rates may be added without requiring a decoder for the next major level to be able to decode the higher sample rate.

This constraint is completely backwards compatible with all currently defined levels. It also does not impact any decoder. However, it does now permit the generation of high frame rate decoders at a lower layer than currently possible.

EXAMPLE

Figure 10

FIG. 10 provides an example in which a new level 5.3 is inserted into the list of FIG. 9, with the same max luma picture size as other levels having major=5, but with double the max luma sample rate and max frame rate of previous level 5.2.

Applying the representation discussed above, the new level 5.3 would occupy the otherwise unused encoding of (16*5)+3=83.

Applying the decoding constraint discussed above, a level 5.3 video data stream would be decodable by a level 6.1 decoder because:

5 is lower than or equal to 6 and
5*2+3 is lower than or equal to 6*2+1.

Therefore the example embodiments provide an alternative method for coding the level is proposed which increases the maximum level from 8.5 to 15.15, along with an alternative constraint is also proposed which allows levels with higher frame rates to be added without requiring all higher level decoders to be able to decoder the increased bitrate.

Example Implementation

An example implementation will now be described with reference to the drawings.

Figure 11:
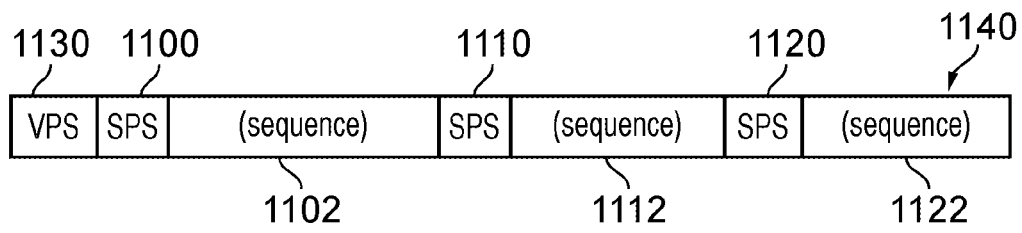
FIG. 11 schematically illustrates the use of parameter sets.

FIG. 11 schematically illustrates the use of video parameter sets and sequence parameter sets as discussed above. In particular, these form part of the hierarchy of parameter sets mentioned earlier such that multiple sequence parameter sets 1100, 1110, 1120 may reference a video parameter set 1130 and in turn be referenced themselves by respective sequences 1102, 1112, 1122. In the example embodiments, level information applicable to the respective sequence is provided in the sequence parameter sets.

However, in other embodiments it will be appreciated that the level information could be provided in a different form or a different parameter set.

Similarly, although the schematic representation of FIG. 11 shows the sequence parameter sets being provided as part of the overall video data stream 1140, the sequence parameter sets (or other data structure carrying the level information) could instead be provided by a separate communication channel. In either case, the level information is associated with the video data stream 1140.

Example Operations—Decoder

Figure 12:
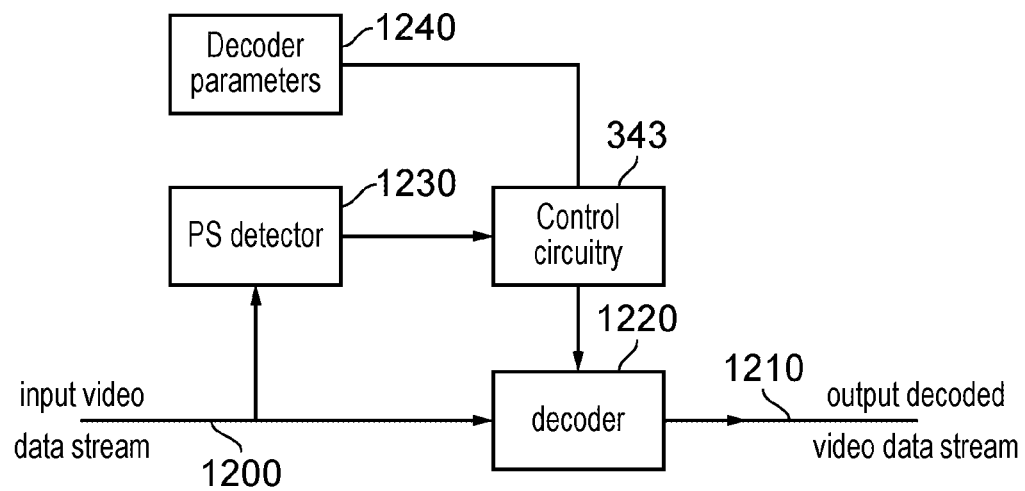
FIG. 12 schematically illustrates aspects of a decoding apparatus.

FIG. 12 schematically illustrates aspects of a decoding apparatus configured to receive an input (encoded) video data stream 1200 and to generate and output decoded video data stream 1210 using a decoder 1220 of the form discussed above with reference to FIG. 7. For clarity of the present explanation, the control circuitry or controller 343 of FIG. 7 is drawn separately to the remainder of the decoder 1220.

Within the functionality of the controller or control circuitry 343 is a parameter set (PS) detector 1230 which detects, from appropriate fields of the input video data stream 1200, the various parameter sets including the VPS, SPS and PPS. The parameter set detector 1230 derives information from the parameter sets including the level as discussed above. This information is passed to the remainder of the control circuitry 343. Note that the parameter set detector 1230 could decode the level or could simply provide the encoded level to the control circuitry 343 for decoding.

The control circuitry 343 is also responsive to one or more decoder parameters 1240 defining at least, for example, a level using the numbering scheme above (major.minor) which the decoder 1220 is capable of decoding.

The control circuitry 343 detects whether or not, for the given or current input video data stream 1200, the decoder 1220 is capable of decoding that input videos data stream and controls the decoder 1220 accordingly. The control circuitry 343 can also provide various other operating parameters to the decoder 1220 in response to information obtained from the parameter sets detected by the parameter set detector 1230.

Figure 13:
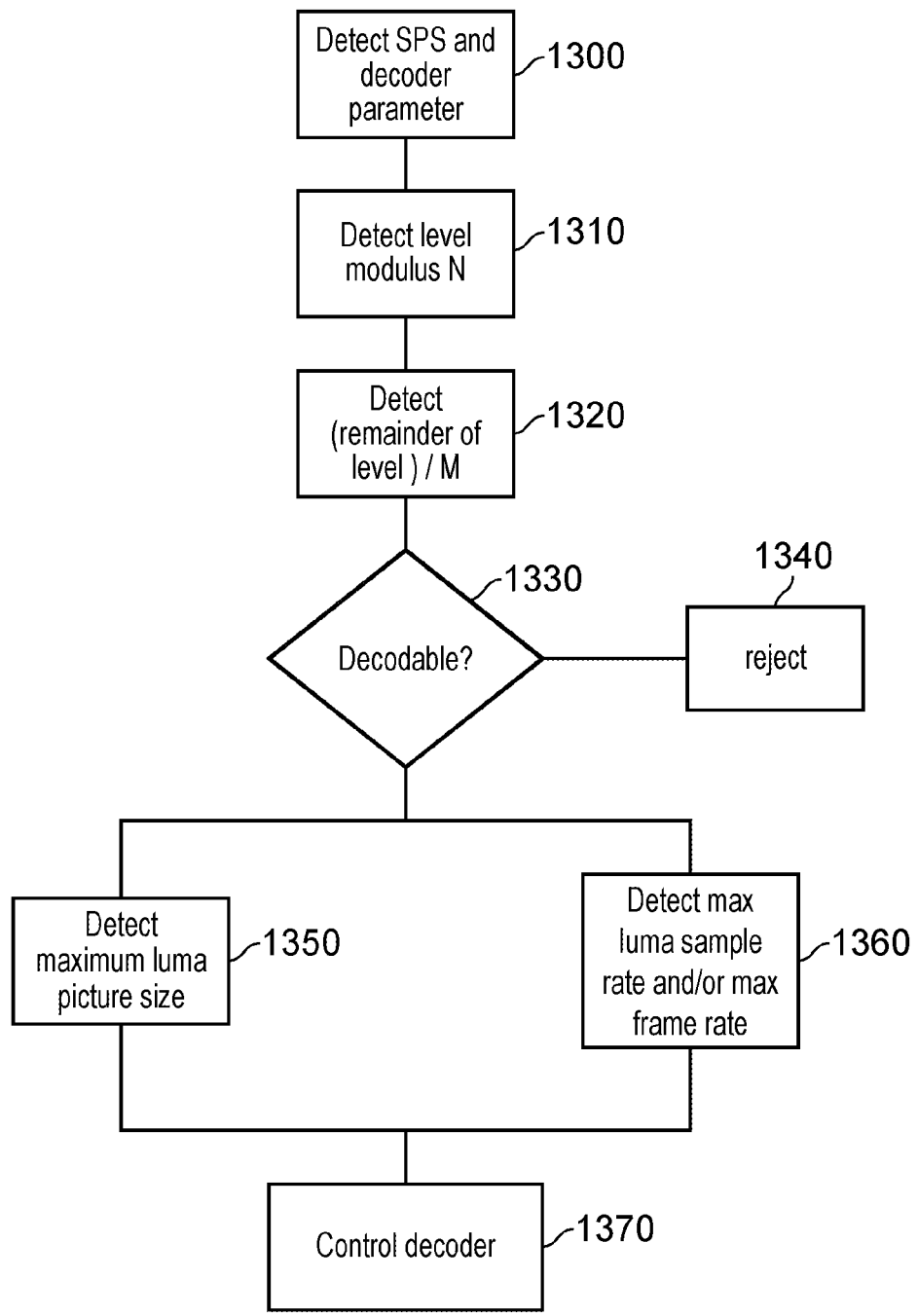
FIG. 13 is a schematic flowchart illustrating a method.

FIG. 13 is a schematic flowchart illustrating these operations at the decoder side.

At a step 1300, the parameter sets decoder 1230 detects the SPS and provides this information to the control circuitry 343. The control circuitry through hundred 43 also detect the decoder parameters 1240.

From the encoded level, the control circuitry 343 detects (at a step 1310) the level modulus N, where N is a first predetermined constant (in this example, 16) and, at a step 1320 detects the remainder of the level divided by M, where N is a second predetermined constant (in this example, 1 though it could be for example 2 or 4, or in a further example, 3). The outcome of the step 1310 provides the major component and the outcome of the step 1320 provides the minor component.

Then, at a step 1330, the control circuitry 343 detects whether the current input video data stream 1200 is decodable, by applying the following test as discussed above, for decoder parameter value D.d and input video stream parameter value S.s:

Does encoded level=255 (S.s represents 15.15)? If it does, then not decodable as 15.15 is a special case indicating a non-standard level. If not then pass to next test:

Is S lower than or equal to D and S*2+s is lower than or equal to D*2+d? If yes then decodable, if no then not decodable The first portion of this test could be omitted optionally.

If the answer is negative then control passes to a step 1340 at which the control circuitry 343 instructs the decoder 1220 not to decode the input video data stream.

If the answer is positive, however, then control passes to steps 1350 and 1360 at which the maximum luminance picture size (step 1350) and the maximum luminance sample rate and/or maximum frame rate (step 1360) are detected using the mapping provided by a stored table such as that shown in FIG. 10. On the basis of these derived parameters, the control circuitry 343 controls the decoder 1220 at a step 1370 to decode the input video data stream 1200.

This therefore provides an example of a method of operating a video data decoder, the method comprising:

detecting (1300) a parameter value associated with an input video data stream, the parameter value indicating an encoding level selected from a plurality of encoding levels, each encoding level defining at least a maximum luminance picture size and a maximum luminance sample rate;

the encoding level defining a first numerical component and a second numerical component, the second numerical component being a numerical value greater than or equal to zero; in which:

for encoding levels having a second numerical component of zero, the first numerical component increases monotonically with increasing maximum luminance picture size; and the second component varies with the maximum luminance sample rate;

the parameter value being a numeric encoding of the encoding level as a first predetermined constant multiplied by the first numerical component plus a second predetermined constant multiplied by the second numerical component;

performing (1330) a predetermined test of the parameter value associated with a given input video data stream with respect to capability data for the video data decoder;

controlling (1370) the video data decoder to decode the given input video stream when the parameter value associated with the given input video data stream passes the predetermined test with respect to the capability data for the video data decoder; and controlling (1340) the video data decoder not to decode the given input video stream when the parameter value associated with the given input video data stream fails the predetermined test with respect to the capability data for the video data decoder.

The arrangement of FIG. 12, operating in accordance with the method of FIG. 13, provides an example of apparatus comprising:

a video data decoder 1220 configured to decode an input video data stream, the video data decoder being responsive to a parameter value associated with the input video data stream, the parameter value indicating an encoding level selected from a plurality of encoding levels, each encoding level defining at least a maximum luminance picture size and a maximum luminance sample rate;

the encoding level defining a first numerical component and a second numerical component, the second numerical component being a numerical value greater than or equal to zero; in which:

for encoding levels having a second numerical component of zero, the first numerical component increases monotonically with increasing maximum luminance picture size; and the second component varies with the maximum luminance sample rate;

the parameter value being a numeric encoding of the encoding level as a first predetermined constant multiplied by the first numerical component plus a second predetermined constant multiplied by the second numerical component;

a comparator configured to perform a predetermined test of the parameter value associated with a given input video data stream with respect to capability data for the video data decoder; and control circuitry 343 configured to control the video data decoder to decode the given input video stream when the parameter value associated with the given input video data stream passes the predetermined test with respect to the capability data for the video data decoder, and to control the video data decoder not to decode the given input video stream when the parameter value associated with the given input video data stream fails the predetermined test with respect to the capability data for the video data decoder.

Example Operations—Encoder

Figure 14:
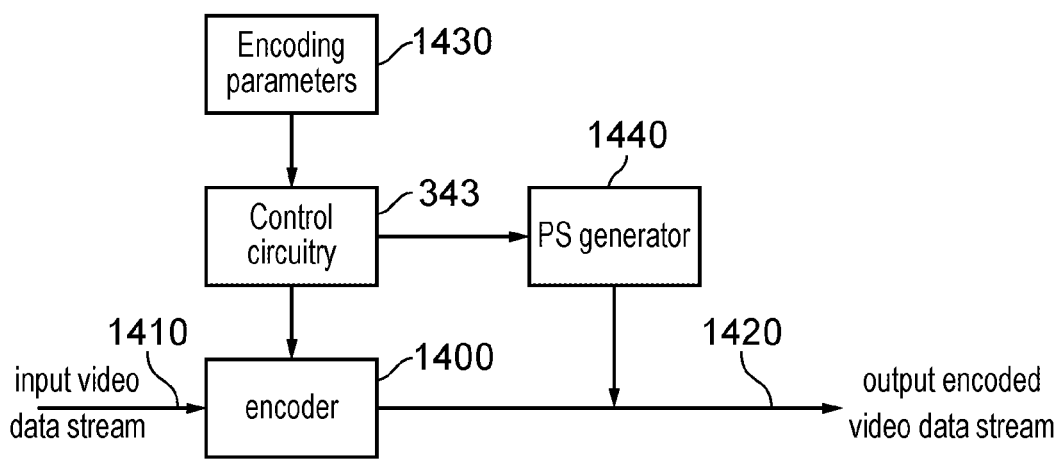
FIG. 14 schematically illustrates aspects of an encoding apparatus.

In a similar way, FIG. 14 schematically illustrates aspects of an encoding apparatus comprising an encoder 1400 of the type discussed above with reference to FIG. 7, for example. The control circuitry 343 the encoder is drawn separately for clarity of the explanation. The encoder acts upon an input video data stream 1410 to generate an output encoded video data stream 1420 under the control of the control circuitry 343 which in turn is responsive to encoding parameters 1430 including a definition of an encoding level to be applied.

The control circuitry 343 also includes or controls a parameter set generator 1440 which generates parameter sets including, for example, the VPS, SPS and PPS to be included within the output encoded video data stream, with the SPS carrying level information encoded as described above.

Aspects of the operation of this apparatus will now be described with reference to a schematic flowchart of FIG. 15.

A step 1500 represents the establishment of an encoding level, for example by the encoding parameters 1430, the encoding level being represented by (major.minor) or in other words (first component. second component).

At a step 1510, the control circuitry 343 controls the encoder 1400 according to the established encoding level.

Separately, in order to encode the encoding level, the parameters set generator 1440, at a step 1520, multiplies the first component (major) by a first predetermined constant N (in this example, 16) and at a step 1530 multiplies the second component (minor) by a second predetermined constant M (in this example, 1, but in other examples to be discussed below, 3) and then at a step 1540 adds the two results to generate the encoded level information. From this, the parameter set generator generates the required parameter sets at a step 1550 including the encoded level information.

This therefore provides an example of a method comprising:

encoding (in response to 1510) an input video data stream to generate an output encoded video data stream according to an encoding level selected from a plurality of encoding levels, each encoding level defining at least a maximum luminance picture size and a maximum luminance sample rate, in which the encoding level defines a first numerical component and a second numerical component, the second numerical component being a numerical value greater than or equal to zero; in which:

for encoding levels having a second numerical component of zero, the first numerical component increases monotonically with increasing maximum luminance picture size; and the second component varies with the maximum luminance sample rate; and encoding (1520, 1530, 1540, 1550) a parameter value for association with the output encoded video data stream, the parameter value being a numeric encoding of the encoding level as a first predetermined constant multiplied by the first numerical component plus a second predetermined constant multiplied by the second numerical component.

Figure 15:
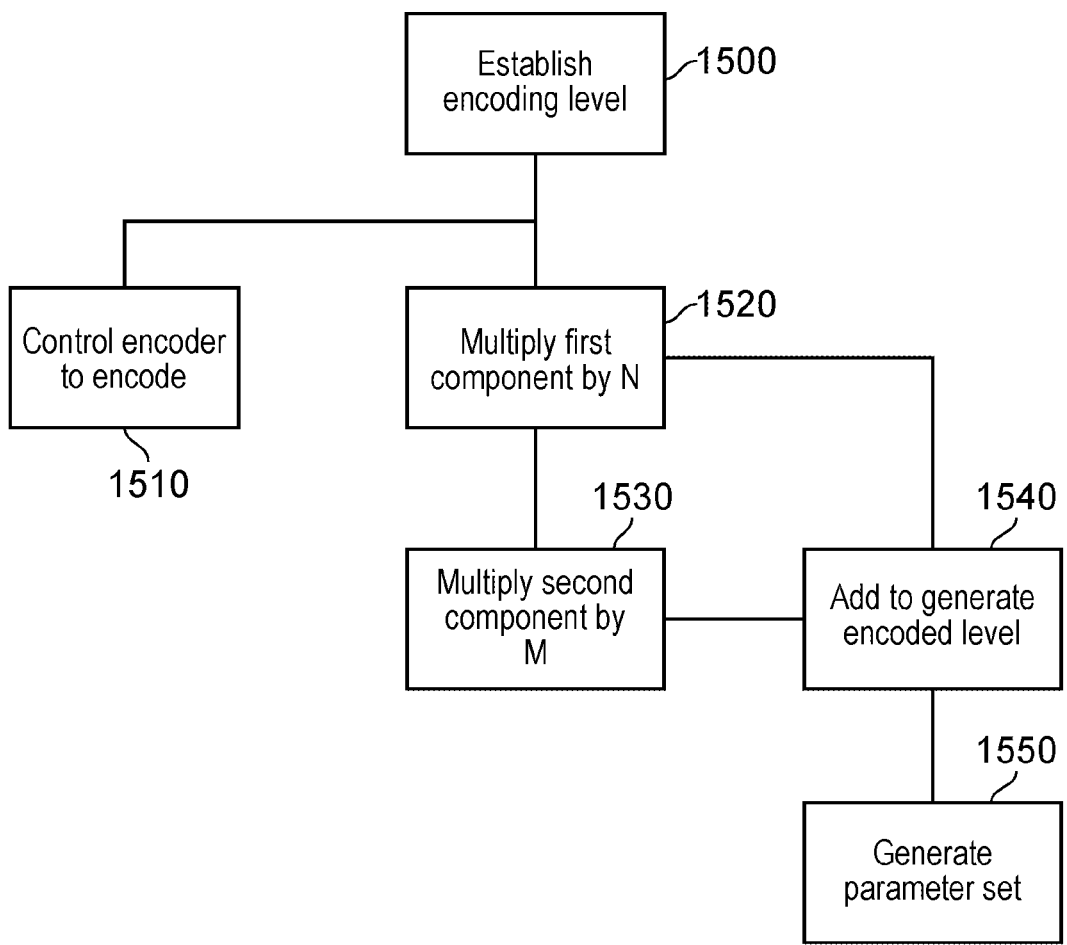
FIG. 15 is a schematic flowchart illustrating a method.

The arrangement of FIG. 14, operating in accordance with the method of FIG. 15, provides an example of apparatus comprising:

a video data encoder 1400 configured to encode an input video data stream to generate an output encoded video data stream according to an encoding level selected from a plurality of encoding levels, each encoding level defining at least a maximum luminance picture size and a maximum luminance sample rate, in which the encoding level defines a first numerical component and a second numerical component, the second numerical component being a numerical value greater than or equal to zero; in which:

for encoding levels having a second numerical component of zero, the first numerical component increases monotonically with increasing maximum luminance picture size; and the second component varies with the maximum luminance sample rate; and parameter value encoding circuitry 1440 configured to encode a parameter value for association with the output encoded video data stream, the parameter value being a numeric encoding of the encoding level as a first predetermined constant multiplied by the first numerical component plus a second predetermined constant multiplied by the second numerical component.

In the above encoding or decoding examples, the second component may increase monotonically with maximum luminance sample rate. In other examples, the second component may vary with maximum luminance sample rate for a given first numerical component. In other examples, the second component may increase monotonically with maximum luminance sample rate for a given first numerical component.

In other examples, for encoding levels having at least a threshold value of the first component: the first component increases monotonically with increasing maximum luminance picture size; and the second component is indicative of at least one of the maximum luminance sample rate, in which for a given first component, the second component varies with the maximum luminance sample rate.

A second numerical component of zero is represented typographically by an absence of a second number (after the decimal point) in the accompanying tables.

With regard to the text "for encoding levels having a second numerical component of zero, the first numerical component increases monotonically with increasing maximum luminance picture size", this indicates that the maximum luminance picture size for level m.0 (or "m") is at least as large as that for level n.0 (or "n") when m>n.

Further Example

A further alternative coding of levels is proposed as follows:

The level is coded in 8 bits as major*16+minor*3.

Here, as above, "major" refers to the whole number value and "minor" to the value after the decimal point, so that for (say) level 5.2, major=5 and minor=2.

So, for example level 4.1 is coded as 67 and the maximum level which can be encoded by this technique is 15.5.

As above, this arrangement implies that the set of levels does not "waste" codes of levels that cannot be ever defined for the reasons discussed above, or at least does not waste them to the extent of the current system.

Also, this in turn extends the highest possible value from 8.5 to 15.5.

An example of coded levels using this arrangement is as follows:

general_level_idc and sublayer_level_idc[i] for all values of i in the VPS (when available) and in the referenced SPSs shall not be equal to 255 (which indicates level 15.15).

The tier and level constraints specified for the Main 10 profile in clause A.4, as applicable, shall be fulfilled.

Conformance of a bitstream to the Main 10 profile is indicated by general_profile_idc being equal to 1.

Decoders conforming to the Main 10 profile at a specific level, D.d of a specific tier shall be capable of decoding all bitstreams for which all of the following conditions apply:

The bitstream is indicated to conform to the Main 10 profile.

The bitstream is indicated to conform to a tier that is lower than or equal to the specified tier.

The bitstream is indicated to conform to a level S.s that is not level 15.15 and is lower than or equal to D and S*2+s is lower than or equal to D*2+d.

[A.3.2 Main 4:4:4 10 Profile]

Bitstreams conforming to the Main 4:4:4 10 profile shall obey the following constraints:

Referenced SPSs shall have chroma_format_idc in the range of 0 to 3, inclusive.

Referenced SPSs shall have bit_depth_minus8 in the range of 0 to 2, inclusive.

| Level | general_level_idc value* | Max luma picture size MaxLumaPs (samples) | Max CPB size MaxCPB (CpbVclFactor or CpbNalFactor bits) Main tier | High tier | Max slices per AU MaxSlicesPerAu | Max # of tiles MaxTilesPerAu | Max # of tile columns MaxTileCols |
|---|---|---|---|---|---|---|---|
| 1.0 | 16 | 36 864 | 350 | — | 16 | 1 | 1 |
| 2.0 | 32 | 122 880 | 1 500 | — | 16 | 1 | 1 |
| 2.1 | 35 | 245 760 | 3 000 | — | 20 | 1 | 1 |
| 3.0 | 48 | 552 960 | 6 000 | — | 30 | 4 | 2 |
| 3.1 | 51 | 983 040 | 10 000 | — | 40 | 9 | 3 |
| 4.0 | 64 | 2 228 224 | 12 000 | 30 000 | 75 | 25 | 5 |
| 4.1 | 67 | 2 228 224 | 20 000 | 50 000 | 75 | 25 | 5 |
| 5.0 | 80 | 8 912 896 | 25 000 | 100 000 | 200 | 110 | 10 |
| 5.1 | 83 | 8 912 896 | 40 000 | 160 000 | 200 | 110 | 10 |
| 5.2 | 86 | 8 912 896 | 60 000 | 240 000 | 200 | 110 | 10 |
| 6.0 | 96 | 35 651 584 | 80 000 | 240 000 | 600 | 440 | 20 |
| 6.1 | 99 | 35 651 584 | 120 000 | 480 000 | 600 | 440 | 20 |
| 6.2 | 102 | 35 651 584 | 180 000 | 800 000 | 600 | 440 | 20 |

*The level numbers in this table are in the form of "majorNum.minorNum", and the value of general_level_idc for each of the levels is equal to majorNum * 16 + minorNum * 3.

Encoded Video Data

Video data encoded by any of the techniques disclosed here is also considered to represent an embodiment of the present disclosure.

Appendix—Draft JVET-Q2001-vE Specification Changes to Reflect the Embodiments

[A.3.1 Main 10 Profile]

Bitstreams conforming to the Main 10 profile shall obey the following constraints:

Referenced SPSs shall have chroma_format_idc equal to 0 or 1.

Referenced SPSs shall have bit_depth_minus8 in the range of 0 to 2, inclusive.

Referenced SPSs shall have sps_palette_enabled_flag equal to 0.

general_level_idc and sublayer_level_idc[i] for all values of i in the VPS (when available) and in the referenced SPSs shall not be equal to 255 (which indicates level 15.15).

The tier and level constraints specified for the Main 4:4:4 10 profile in clause A.4, as applicable, shall be fulfilled.

Conformance of a bitstream to the Main 4:4:4 10 profile is indicated by general_profile_idc being equal to 2.

Decoders conforming to the Main 4:4:4 10 profile at a specific level D.d of a specific tier shall be capable of decoding all bitstreams for which all of the following conditions apply:

The bitstream is indicated to conform to the Main 4:4:4 10 or Main 10 profile.

The bitstream is indicated to conform to a tier that is lower than or equal to the specified tier.

The bitstream is indicated to conform to a level S.s that is not level 15.15 and is lower than or equal to D and S*2+s is lower than or equal to D*2+d.

[A.4.1 General Tier and Level Limits]

Table A.1 specifies the limits for each level of each tier for levels other than level 15.15.

A tier and level to which a bitstream conforms are indicated by the syntax elements general_tier_flag and general_level_idc, and a level to which a sublayer representation conforms are indicated by the syntax element sublayer_level_idc[i], as follows:

If the specified level is not level 15.15, general_tier_flag equal to 0 indicates conformance to the Main tier, general_tier_flag equal to 1 indicates conformance to the High tier, according to the tier constraints specified in Table A.1 and general_tier_flag shall be equal to 0 for levels below level 4 (corresponding to the entries in Table A.1 marked with "-"). Otherwise (the specified level is level 15.15), it is a requirement of bitstream conformance that general_tier_flag shall be equal to 1 and the value 0 for general_tier_flag is reserved for future use by ITU-T|ISO/IEC and decoders shall ignore the value of general_tier_flag.

general_level_idc and sublayer_level_idc[i] shall be set equal to a value 16 times the major level number plus 1 times the minor level number specified in Table A.1.

All other references to level 8.5 also changed to level 15.15.

As an alternative, the level 15.15 could instead be specified throughout using a variable name such as "limitless_level_idc", with that variable being defined once as 15.15.

With reference to the alternative embodiment discussed above, the following text relates to Appendix 4.1 of JVET-T2001-v1 of the 20$^{th}$ JVET meeting in October 2020 (the contents of which are hereby incorporated by reference):

A tier and level to which a bitstream conforms are indicated by the syntax elements general_tier_flag and general_level_idc, and a level to which a sublayer representation conforms are indicated by the syntax element sublayer_level_idc[i], as follows:

If the specified level is not level 15.5, general_tier_flag equal to 0 indicates conformance to the Main tier, general_tier_flag equal to 1 indicates conformance to the High tier, according to the tier constraints specified in Table 135 and general_tier_flag shall be equal to 0 for levels below level 4 (corresponding to the entries in Table 135 marked with "-"). Otherwise (the specified level is level 15.5), it is a requirement of bitstream conformance that general_tier_flag shall be equal to 1 and the value 0 for general_tier_flag is reserved for future use by ITU-T|ISO/IEC and decoders shall ignore the value of general_tier_flag.

general_level_idc and sublayer_level_idc[i] shall be set equal to a value of general_level_idc for the level number specified in Table 135.

(Note that table 135 is reproduced above in connection with the alternative embodiment).

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Similarly, a data signal comprising coded data generated according to the methods discussed above (whether or not embodied on a non-transitory machine-readable medium) is also considered to represent an embodiment of the present disclosure.

It will be apparent that numerous modifications and variations of the present disclosure are possible in light of the above teachings. It is therefore to be understood that within the scope of the appended clauses, the technology may be practised otherwise than as specifically described herein.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments. Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

Respective aspects and features are defined by the following numbered clauses:

1. Apparatus comprising:
    a video data decoder configured to decode an input video data stream, the video data decoder being responsive to a parameter value associated with the input video data stream, the parameter value indicating an encoding level selected from a plurality of encoding levels, each encoding level defining at least a maximum luminance picture size and a maximum luminance sample rate;
    the encoding level defining a first numerical component and a second numerical component, the second numerical component being a numerical value greater than or equal to zero; in which:
        for encoding levels having a second numerical component of zero, the first numerical component increases monotonically with increasing maximum luminance picture size; and
        the second component varies with the maximum luminance sample rate;
    the parameter value being a numeric encoding of the encoding level as a first predetermined constant multiplied by the first numerical component plus a second predetermined constant multiplied by the second numerical component;
    a comparator configured to perform a predetermined test of the parameter value associated with a given input video data stream with respect to capability data for the video data decoder; and
    control circuitry configured to control the video data decoder to decode the given input video stream when the parameter value associated with the given input video data stream passes the predetermined test with respect to the capability data for the video data decoder, and to control the video data decoder not to decode the given input video stream when the parameter value associated with the given input video data stream fails the predetermined test with respect to the capability data for the video data decoder.
2. The apparatus of clause 1, in which the predetermined test comprises a detection of whether, for the first numerical component (S) and the second numerical component (s) represented by the parameter value associated with the given input video data stream and a first numerical component (D) and a second numerical component (d) of the capability data for the video data decoder:
Are (i) S lower than or equal to D and (ii) S*2+s is lower than or equal to D*2+d.
3. The apparatus of clause 1 or clause 2, comprising a detector configured to detect the parameter value from a parameter set associated with the input video data stream.
4. The apparatus of clause 3, in which the parameter set is a sequence parameter set.
5. The apparatus of any one of the preceding clauses, in which the first predetermined constant is 16.
6. The apparatus of any one of the preceding clauses, in which the second predetermined constant is 1.
7. The apparatus of one of clauses 1 to 5, in which the second predetermined constant is 3.
8. The apparatus of any one of the preceding clauses, in which the parameter value comprises an 8 bit value.
9. The apparatus of any one of the preceding clauses, in which the predetermined test comprises a detection of whether the parameter value associated with the input video stream is not equal to 255.
10. Video storage, capture, transmission or reception apparatus comprising apparatus according to any one of the preceding clauses.
11. Apparatus comprising:
a video data encoder configured to encode an input video data stream to generate an output encoded video data stream according to an encoding level selected from a plurality of encoding levels, each encoding level defining at least a maximum luminance picture size and a maximum luminance sample rate, in which the encoding level defines a first numerical component and a second numerical component, the second numerical component being a numerical value greater than or equal to zero; in which:
for encoding levels having a second numerical component of zero, the first numerical component increases monotonically with increasing maximum luminance picture size; and
the second component varies with the maximum luminance sample rate; and
parameter value encoding circuitry configured to encode a parameter value for association with the output encoded video data stream, the parameter value being a numeric encoding of the encoding level as a first predetermined constant multiplied by the first numerical component plus a second predetermined constant multiplied by the second numerical component.
12. The apparatus of clause 11, in which the parameter value encoding circuitry is configured to encode the parameter value as at least a part of a parameter set associated with the output encoded video data stream.
13. The apparatus of clause 12, in which the parameter set is a sequence parameter set.
14. The apparatus of any one of clauses 11 to 13, in which the first predetermined constant is 16.
15. The apparatus of any one of clauses 11 to 14, in which the second predetermined constant is 1.
16. The apparatus of any one of clauses 11 to 14, in which the second predetermined constant is 1.
17. The apparatus of any one of clauses 11 to 16, in which the parameter value comprises an 8 bit value.
18. Video storage, capture, transmission or reception apparatus comprising apparatus according to any one of clauses 11 to 17.
19. A method of operating a video data decoder, the method comprising:
detecting a parameter value associated with an input video data stream, the parameter value indicating an encoding level selected from a plurality of encoding levels, each encoding level defining at least a maximum luminance picture size and a maximum luminance sample rate;
the encoding level defining a first numerical component and a second numerical component, the second numerical component being a numerical value greater than or equal to zero; in which:
for encoding levels having a second numerical component of zero, the first numerical component increases monotonically with increasing maximum luminance picture size; and
the second component varies with the maximum luminance sample rate;
the parameter value being a numeric encoding of the encoding level as a first predetermined constant multiplied by the first numerical component plus a second predetermined constant multiplied by the second numerical component;
performing a predetermined test of the parameter value associated with a given input video data stream with respect to capability data for the video data decoder;
controlling the video data decoder to decode the given input video stream when the parameter value associated with the given input video data stream passes the predetermined test with respect to the capability data for the video data decoder; and
controlling the video data decoder not to decode the given input video stream when the parameter value associated with the given input video data stream fails the predetermined test with respect to the capability data for the video data decoder.
20. A machine-readable non-transitory storage medium which stores computer software which, when executed by a computer, causes the computer to carry out the method of clause 19.
21. A method comprising:
encoding an input video data stream to generate an output encoded video data stream according to an encoding level selected from a plurality of encoding levels, each encoding level defining at least a maximum luminance picture size and a maximum luminance sample rate, in which the encoding level defines a first numerical component and a second numerical component, the second numerical component being a numerical value greater than or equal to zero; in which:
for encoding levels having a second numerical component of zero, the first numerical component increases monotonically with increasing maximum luminance picture size; and
the second component varies with the maximum luminance sample rate; and encoding a parameter value for association with the output encoded video data stream, the parameter value being a numeric encoding of the encoding level as a first predetermined constant multiplied by the first numerical component plus a second predetermined constant multiplied by the second numerical component.

22. A machine-readable non-transitory storage medium which stores computer software which, when executed by a computer, causes the computer to carry out the method of clause 21.

We claim:

1. A method comprising:
obtaining a video stream;
decoding a value from the video stream; and
decoding the video stream via circuitry which uses the value to decode the video stream, the value being a numeric encoding of an encoding level to which the video stream conforms,
wherein the encoding level is represented in a form majorNum.minorNum, and the value is a sum of majorNum multiplied by a first constant added to the minorNum multiplied by a second constant.

2. The method as claimed in claim 1, wherein the first constant is sixteen.

3. The method as claimed in claim 2, wherein the second constant is an integer greater than one.

4. The method as claimed in claim 2, wherein the maximum level is when majorNum is equal to fifteen and, the minorNum and the second constant are such that the level is coded as eight bits.

5. The method as claimed in claim 1, wherein the second constant is an integer greater than one.

6. The method as claimed in claim 1, wherein the value is a parameter value having eight bits.

7. The method as claimed in claim 1, wherein the maximum value decodable as a level by the circuitry is when majorNum is equal to fifteen.

8. The method as claimed in claim 7, wherein the maximum level corresponds to a value of 255 decimal which is interpreted by the circuitry as a special case.

9. A non-transitory storage medium comprising code components which when executed by a computer cause the computer to perform the method according to claim 1.

10. An apparatus comprising:
circuitry configured to:
receive a video stream,
decode a value from the video stream, and
decode the video stream using the value to decode the video stream, the value being a numeric encoding of an encoding level to which the video stream conforms,
wherein the encoding level is represented in a form majorNum.minorNum, and the value is a sum of majorNum multiplied by a first constant added to the minorNum multiplied by a second constant.

11. The apparatus as claimed in claim 10, wherein the first constant is sixteen.

12. The apparatus as claimed in claim 11, wherein the second constant is an integer greater than one.

13. The apparatus as claimed in claim 11, wherein the maximum level is when majorNum is equal to fifteen and, the minorNum and the second constant are such that the level is coded as eight bits.

14. The apparatus as claimed in claim 13, wherein the maximum level corresponds to a value of 255 decimal which is interpreted by the circuitry as a special case.

15. The apparatus as claimed in claim 10, wherein the second constant is an integer greater than one.

16. The apparatus as claimed in claim 10, wherein the value is a parameter value having eight bits.

17. The apparatus as claimed in claim 10, wherein the maximum value decodable as a level by the circuitry is when majorNum is equal to fifteen.

18. A video storage, capture, transmission or reception apparatus comprising the apparatus according to claim 10.

19. A method comprising:
obtaining a video stream;
decoding a value from the video stream; and
decoding the video stream via circuitry which uses the value to decode the video stream, the value being an expression of a level to which the video stream conforms,
wherein the level is in a form majorNum.minorNum, the level defining a maximum luminance picture sample rate, the circuitry being configured to a decode a video stream having a first maximum luminance picture sample rate at a level with majorNum smaller than a video stream of a different level having higher MajorNum and a second maximum luminance picture sample rate the second maximum luminance picture sample rate being lower than the first maximum luminance picture sample rate.

* * * * *